United States Patent
Quick, Jr.

(10) Patent No.: US 10,708,924 B2
(45) Date of Patent: Jul. 7, 2020

(54) DATA COMMUNICATION USING INTERFERENCE ALIGNMENT

(71) Applicant: Trabus Technologies, San Diego, CA (US)

(72) Inventor: Roy Franklin Quick, Jr., San Diego, CA (US)

(73) Assignee: Trabus Technologies, San Diego, CA (US)

( * ) Notice: Subject to any disclaimer, the term of this patent is extended or adjusted under 35 U.S.C. 154(b) by 27 days.

(21) Appl. No.: 16/228,194

(22) Filed: Dec. 20, 2018

(65) Prior Publication Data

US 2019/0261377 A1    Aug. 22, 2019

Related U.S. Application Data

(60) Provisional application No. 62/634,031, filed on Feb. 22, 2018.

(51) Int. Cl.
*H04W 72/08* (2009.01)
*H04L 5/00* (2006.01)
(Continued)

(52) U.S. Cl.
CPC ......... *H04W 72/082* (2013.01); *H04L 5/0073* (2013.01); *H04W 56/002* (2013.01); *H04W 72/0446* (2013.01); *H04W 88/08* (2013.01)

(58) Field of Classification Search
CPC .................. H04J 3/0679; H04J 2203/0089
See application file for complete search history.

(56) References Cited

U.S. PATENT DOCUMENTS

| 5,796,793 A * | 8/1998 | Kainulainen ......... H04J 3/0679 370/408 |
| 7,031,329 B2 * | 4/2006 | Lipsanen .............. H04J 3/0679 370/408 |

(Continued)

FOREIGN PATENT DOCUMENTS

| CN | 105978615 A | 9/2016 |
| EP | 2040390 A1 | 3/2009 |

(Continued)

OTHER PUBLICATIONS

Invitation to Pay Additional Fees, and, Where Applicable, Protest Fee for related PCT application No. PCT/US2019/018839, dated May 31, 2019, in 13 pages.

(Continued)

*Primary Examiner* — Melanie Jagannathan
(74) *Attorney, Agent, or Firm* — Procopio Cory Hargreaves and Savitch LLP

(57) ABSTRACT

Systems, methods, and computer readable media for communication in a network having a plurality of transceiver units are provided. The method can include transmitting by each transceiver unit (TU), a first broadcast message including a unique identifier of a respective TU and a network timing source identifier indicating the unique identifier of a TU upon which the respective TU relies for network time. The method can include receiving at the plurality of TUs, the first broadcast messages from one or more of the plurality of TUs. The method can include selecting, by each TU, a network timing source from among the plurality of TUs based on the unique identifiers and the network timing source identifiers. The network timing source can serve as the timing source for communications within the network.

12 Claims, 10 Drawing Sheets

(51) Int. Cl.
*H04W 72/04* (2009.01)
*H04W 56/00* (2009.01)
*H04W 88/08* (2009.01)

(56) References Cited

U.S. PATENT DOCUMENTS

| | | | |
|---|---|---|---|
| 8,811,238 B2* | 8/2014 | Huang | H04W 56/002 370/280 |
| 2008/0181285 A1 | 7/2008 | Hwang et al. | |
| 2011/0222468 A1 | 9/2011 | Li | |
| 2011/0255527 A1 | 10/2011 | Chowdhary et al. | |
| 2012/0257574 A1 | 10/2012 | Seok et al. | |
| 2013/0034187 A1 | 2/2013 | Taoka et al. | |
| 2013/0267266 A1 | 10/2013 | Park et al. | |
| 2013/0301746 A1 | 11/2013 | Mobasher et al. | |
| 2015/0131751 A1 | 5/2015 | Bayesteh et al. | |
| 2015/0139128 A1 | 5/2015 | Park et al. | |
| 2016/0249366 A1 | 8/2016 | Seok | |
| 2016/0315726 A1 | 10/2016 | Sandberg et al. | |
| 2016/0373223 A1 | 12/2016 | Quick, Jr. | |
| 2018/0184433 A1 | 6/2018 | Kim et al. | |

FOREIGN PATENT DOCUMENTS

| | | |
|---|---|---|
| KR | 101402932 B1 | 6/2014 |
| KR | 20150065140 A | 6/2015 |

OTHER PUBLICATIONS

International Search Report and Written Opinion for related PCT application No. PCT/US2019/018839, dated Aug. 12, 2019, in 18 pages.

Zhu et al., Investigation on precoding techniques in E-UTRA and proposed adaptive precoding scheme for MIMO systems, article, Proceeding of APCC2008, 2008, 5 pages.

Jafar, Interference Alignment : a New Look at Signal Dimensions in a Communication Network, Foundations and Trends in Communications and Information Theory, vol. 7, No. 1 (2010), pp. 1-134.

Tan, Cognitive Radio Networks : Performance, Applications and Technology, Nova Science Publishers, Inc., 2018, Hauppauge, New York.

* cited by examiner

DATA COMMUNICATION USING INTERFERENCE ALIGNMENT

CROSS-REFERENCE TO RELATED APPLICATIONS

This application claims priority to U.S. Provisional Patent Application Ser. No. 62/634,031, filed Feb. 22, 2018, entitled "DATA COMMUNICATION USING INTERFERENCE ALIGNMENT," the contents of which are hereby incorporated by reference in their entirety.

BACKGROUND

Technical Field

This disclosure relates to wireless communications. More specifically, this disclosure relates to managing a network timing source within a wireless communication network.

Related Art

In a wireless communication system, interference can arise when multiple transmitters attempt to transmit data to multiple receivers at the same time over a common channel. For example, in a mobile communication network, several base stations (BSs) can share the same carrier frequency when communicating with different mobile communication devices. This reuse of frequency from one BS to another may create inter-cell interference (ICI) that negatively impacts data rates throughout the mobile communication network.

Many communication systems may address interference by avoiding overlapping transmissions. For example, a mobile communication network can be configured with a lower frequency reuse factor such that fewer cells may share the same carrier frequency. But a communication system's bandwidth may be under-utilized due to overly conservative allocation of the communication system's radio resources.

SUMMARY

An aspect of the disclosure provides a method for communication in a network having a plurality of transceiver units. The method can include transmitting by each transceiver unit (TU) of the plurality of TUs, a first broadcast message. The first broadcast messages can include a unique identifier of a respective TU of the plurality of TUs transmitting the first broadcast message. The first broadcast messages can include a network timing source identifier indicating the unique identifier of a TU upon which the respective TU relies for network time. The method can include receiving at the plurality of TUs, the first broadcast messages from one or more of the plurality of TUs. The method can include selecting, by each TU, a network timing source from among the plurality of TUs based on the unique identifiers and the network timing source identifiers. The network timing source can serve as the timing source for communications within the network.

Another aspect of the disclosure provides a method for communication in a network having a plurality of transceiver units. The method can include transmitting by a first transceiver unit (TU) of the plurality of TUs, a first broadcast message, including a first unique identifier of a first timing source of the first TU. The method can include receiving, from a second TU of the plurality of TUs, a second broadcast message including a second unique identifier of a second timing source of the second TU. The method can include selecting a network timing source from the first timing source and second timing source based on the first unique identifier and the second unique identifier. The network timing source can serve as a timing reference for communications within the network.

Another aspect of the disclosure provides a non-transitory computer-readable medium comprising instructions for communication in a network having a plurality of transceiver units. When executed by one or more processors of a computer the instructions cause the computer to transmit by a first transceiver unit (TU) of the plurality of TUs, a first broadcast message, including a first unique identifier of a first timing source of the first TU. The instructions can further cause the computer receive, from a second TU of the plurality of TUs, a second broadcast message including a second unique identifier of a second timing source of the second TU. The instructions can further cause the computer select a network timing source from the first timing source and second timing source based on the first unique identifier and the second unique identifier, the network timing source serving as a timing reference for communications within the network.

Other features and advantages will be apparent to one of ordinary skill with a review of the follow description.

BRIEF DESCRIPTION OF THE DRAWINGS

The details of embodiments of the present disclosure, both as to their structure and operation, can be gleaned in part by study of the accompanying drawings, in which like reference numerals refer to like parts, and in which.

DETAILED DESCRIPTION

Interference alignment (IA) is a linear precoding technique that attempts to align interfering signals in time, frequency, or space. IA can use transmit and receive antenna arrays to allow multiple transmitters to send at the same time on the same resources. IA accomplishes this by canceling the interference from other transmitters while preserving the signal from the intended transmitter. IA can provide higher throughput gains than multiple-in, multiple-out (MIMO) when the channels are of less than full rank. IA also avoids having to allocate resources among the transmit/receive pairs. IA can use the spatial dimensions offered by multiple antennas for interference reduction. In one example, users can coordinate their transmissions, using linear precoding, such that the interference signals lie in a reduced dimensional subspace at each receiver.

Certain embodiments disclosed herein provide for systems and methods for data communication using IA based on the autonomous selection or autonomous determination of precoding weights for various antennas at a transmitter. After reading this description it will become apparent to one skilled in the art how to implement the invention in various alternative embodiments and alternative applications. However, although various embodiments of the present invention are described herein, they are presented by way of example only, and not limitation. Accordingly, this detailed description of various embodiments should not be construed to limit the scope or breadth of the disclosure as set forth in the appended claims.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
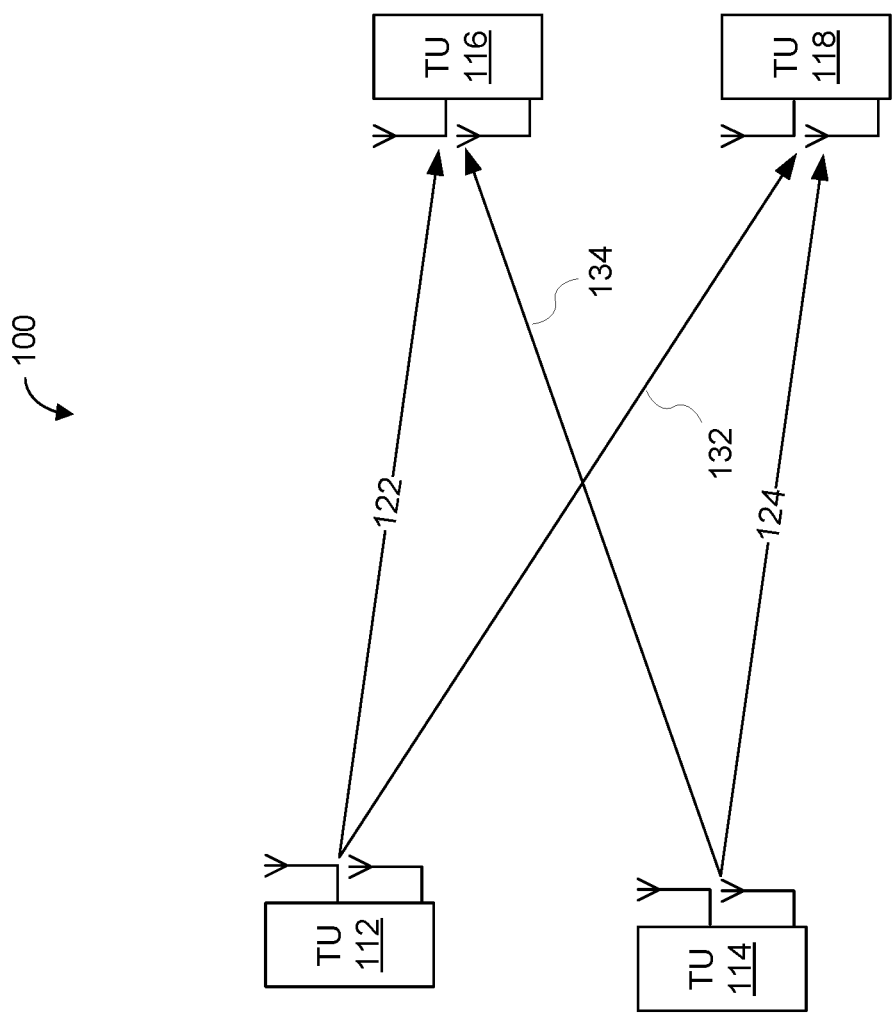
FIG. 1 is a functional block diagram of a network environment.

FIG. 1 is a functional block diagram of a network environment. A network environment 100 can have a plurality of transceiver units (TU) including, for example, a first TU 112, a second TU 114, a third TU 116, and a fourth TU 118. In some embodiments, the TUs can be, for example, a mobile units or mobile unit, a user equipment (UE), a user terminal, a mobile wireless device, a cellular phone, wireless access point, base station, or other wireless communication devices. The TUs can implement one or more wireless communication protocols and operate according to communication standards such as, for example, IEEE 802.11, Global System for Mobile Communication (GSM), Universal Mobile Telecommunications System (UMTS), Orthogonal frequency-division multiplexing (OFDM), multiple-input and multiple-output (MIMO), Space-Division Multiple Access (SDMA), code division multiple access (CDMA), Long Term Evolution (LTE), Joint Tactical Information Distribution System (JTIDS), and LINK-16/Multifunctional Information Distribution System (MIDS). In various embodiments, one or more of the first TU 112, the second TU 114, the third TU 116, and the fourth TU 118 can be associated with one or more communication networks. Each of the first TU 112, the second TU 114, the third TU 116, and the fourth TU 118 is shown having two antennas, however, in some embodiments, each of the noted TUs can have a different number of antennas without departing from the scope of the disclosure. For example, the first TU 112, the second TU 114, the third TU 116, and the fourth TU 118 can each have one or more antennas. The one or more antennas can be useful in wireless communication protocols requiring multiple antennas, such as, for example, multiple-in multiple-out (MIMO) communications or space-division multiple access (SDMA) communications among various other wireless communication protocols.

The first TU 112 can transmit a first signal 122 to the third TU 116 and the second TU 114 may transmit a second signal 124 to the fourth TU 118. In some embodiments, the first TU 112 and the second TU 114 can share a same carrier frequency. As such, in addition to transmitting the first signal 122 to the third TU 116, the first TU 112 can also transmit a first interference signal 132 to the fourth TU 118. Similarly, in addition to transmitting the second signal 124 to the fourth TU 118, the second TU 114 may also transmit a second interference signal 134 to the third TU 116. The interference signals 132, 134 are such because they arrive at a location other than the intended recipient and, at that recipient, the interference signals 132, 134 are unrelated to the signal from the intended sender. Accordingly, the interfering signal 132 sent by the first TU 112 can result from the transmission of the first signal 122 but because it arrives at the wrong recipient (e.g., the fourth TU 118). Thus to the fourth TU 118, the first signal 122 is the interfering signal 132. In some examples, the interfering signal 132 can be a delayed or altered version of the first signal 122 and is considered "interfering" because the fourth TU is not the intended receiver. The second signal 124 and the interfering signal 134 can have a similar relationship.

In various embodiments, the first interference signal 132 and the second interference signal 134 can be a part of an interference channel (IC). In some examples, an IC can model a situation in which a number (e.g., n-number, where n is an integer) of independent transmitters (e.g., the first TU 112 and the second TU 114) attempt communication of separate information to n-number of different receivers (e.g., the third TU 116 and the fourth TU 118) via a common channel (e.g., the first interference signal 132, and the second interference signal 134). In some examples, there is a one-to-one correlation between transmitters and receivers, as in FIG. 1. Consequently, the transmission of information from each transmitter to its corresponding receiver interferes with the communication between the other transmitters and their receivers.

In some embodiments, the first interference signal 132, and the second interference signal 134 can each be precoded in order to align the first interference signal 132 and the second interference signal 134 received at each of the third TU 116 and the fourth TU 118 into a low dimensional subspace.

In some embodiments, one or more TUs in the network environment 100 (e.g., the first TU 112, the second TU 114, the third TU 116, and the fourth TU 118) can act as one or both of a transmitter or receiver (e.g., a transceiver) without departing from the scope of the disclosure. Moreover, the network environment 100 can have more or fewer TUs than the four shown.

As noted above, the network environment 100 can use one or more various wireless communication protocols. In some embodiments, the network environment 100 can use one or more of wireless communication standards such as, for example, those listed above.

Figure 2:
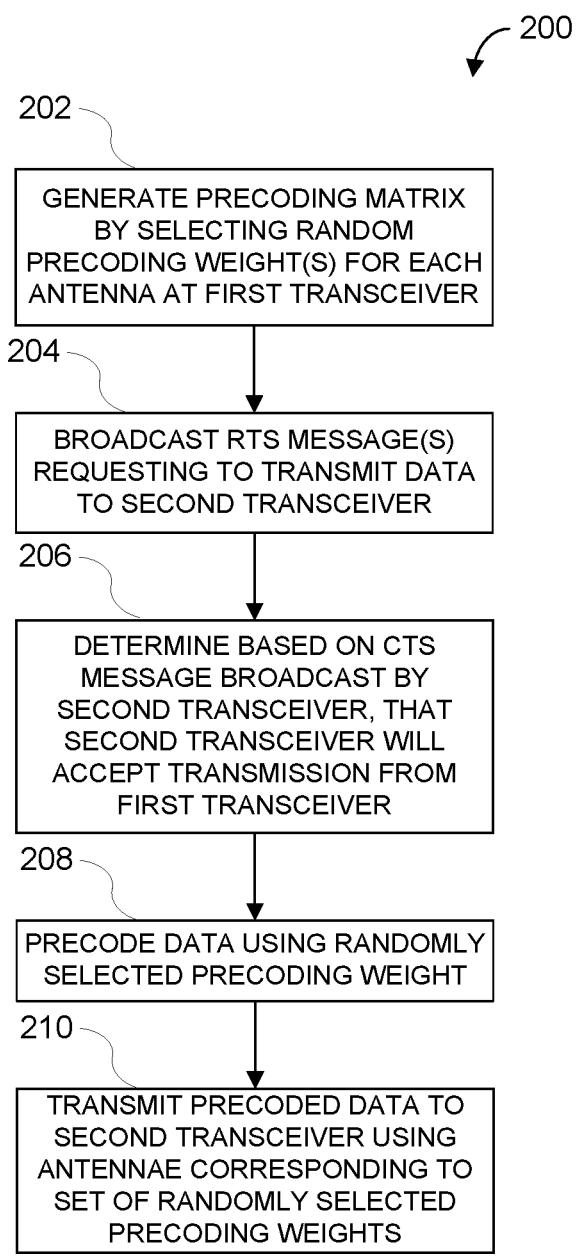
FIG. 2 is a flowchart of an embodiment of a method for data communication.

FIG. 2 is a flowchart of an embodiment of a method for data communication. A method 200 can be performed by one or more transceiver units (e.g., the first TU 112, the second TU 114, third TU 116, and the fourth TU 118) in the network environment 100.

At block 202, a first transceiver unit can generate a set of precoding weights by autonomously selecting a precoding weight for each antenna at the first transceiver unit. As used herein, autonomous selection can refer to the first transceiver determining the precoding weights without the use of information obtained from other transceiver units. The autonomous selection of the precoding weights can be completed using one of a number of different processes. For example, in some embodiments, the selection process can be arbitrary, random, or pseudo-random. In some other embodiments, the selection process for selecting the precoding weights can be non-random or deterministic. In some embodiments, the selection process can be a predetermined process. The predetermined process can be determined at any time before the selection of the precoding weights. For example, the first TU 112 can select or determine a set of precoding weights for a transmission to the third TU 116. In some embodiments, the first TU 112 can select precoding weights without requiring knowledge of channel condition measurements from other TUs in the network environment 100 (e.g., the second TU 114, the third TU 116, and the fourth TU 118).

In some embodiments, the first TU 112 can select precoding weights having a fixed magnitude but random phases. As such, each antenna at the first TU 112 can transmit at full power to provide optimal communication performance.

In some embodiments, the speed or the rate at which the precoding weights change can be adjusted based on variations in channel conditions over time. For example, in the event that channel conditions change frequently, the rate of change of the selected precoding weights may be slow as the variation in channel conditions may be harnessed to randomize communication performance. In contrast, if channel conditions are relatively stable, the rate of change of the selected precoding weights may be fast in order to ensure optimal communication performance.

At block 204, the first transceiver unit can broadcast one or more messages requesting to transmit data to a second transceiver unit. In some embodiments, the one or more messages can be a request to send (RTS) message. For convenience of description, the RTS may be used herein as a primary example, however, it should not be considered limiting. Any suitable transmission can be implemented.

In some embodiments, the RTS message(s) broadcast by the first transceiver unit can include the set of selected precoding weights for the first transceiver unit. For example, the first TU 112 can broadcast RTS messages requesting to transmit data to the third TU 116. The broadcast RTS messages can indicate the set of precoding weights selected by the first TU 112. RTS messages are used as a primary examine herein, however, in some embodiments, the transmitting transceiver unit (e.g., the first TU 112 or the second TU 114) can transmit a reference signal having the selected precoding weights. In some other embodiments, the set of precoding weights can be sent by the first TU 112 in a reference signal or pilot signal.

In some embodiments, the other (receiving) transceiver units in the network environment 100 (e.g., the second TU 114 and the fourth TU 118) can each be configured to determine whether to accept the transmission from the first TU 112. In some examples, the RTS message (or other request message) can include information identifying the transmitting TU, such as, for example, the identifier of the selected transmitter. The identifier can be either a global identifier (such as IEEE media access control, or MAC address) or a local network-specific identifier (NSID). In some examples, the NSID can be, or be similar to, the temporary mobile subscriber identity (TMSI) in cellular networks and the radio network temporary identifier (RNTI) used in LTE base stations. Accordingly, the receiving transceiver unit can identify and accept or ignore a request message based on, for example, the identity of the sender. The receiving transceiver units can use other information to determine whether to accept or ignore/reject the request message.

For example, multiple TUs (e.g., the first TU 112 and the second TU 114) can request to transmit data to the third TU 116. The third TU 116 may then receive RTS messages from both the first TU 112 and the second TU 114 having respective indications of the selected precoding weights from each TU. In some embodiments, the third TU 116 can resolve the conflict as to which transmission to accept by applying a selection process. Such a selection process can be random, pseudo-random, or deterministic using, for example, a number obtained from a random number generator, a transmission priority, and a predicted signal to noise ratio (SNR). The predicted SNR can be predicted by the receiver and not contained in the RTS. In some embodiments, more than one method can be used. For example, if two transmissions arriving at the third TU 116 have the same priority, another selection method can be used to break the tie, such as, for example, a random number. If the third TU 116 determines to accept the transmission from the first TU 112 and not from the second TU 114, the third TU 116 can respond with a message indicating that the third TU 116 can accept the transmission from the first TU 112. For example, the third TU 116 can broadcast a clear to send (CTS) message intended for the first TU 112 indicating acceptance of the transmission. In some examples, a CTS message can include the identifier of the selected transmitter. In an embodiment, the selection can be based on the channel quality expected given the precoding weights. In such an example, the third TU 116 can then remain silent with respect to the RTS message received from the second TU 114. For convenience of description, the CTS messages may be used herein as a primary example, however this should not be considered limiting. Any suitable message, datagram, or other communication can provide a similar function, indicating acceptance of the transmission from the first TU 112.

In another example, the third TU 116 can determine to not accept the transmission from the first TU 112 and instead accept the transmission from the second TU 114. Accordingly, the third TU 116 may remain silent and not broadcast a CTS or other type of message accepting the transmission from the first TU 112. Instead the third TU 116 can broadcast a CTS or other suitable message indicating acceptance of the transmission from the second TU 114. In some other embodiments, the third TU 116 may not accept any transmissions. For example, the third TU 116 may have data to send to another TU, and that data is accepted. In another example, the first TU 112 and the third TU 116 may have data to send to each other. The same selection method or algorithm described above can be used to resolve such conflicts.

At block 206, the first transceiver unit can determine, based on a CTS message broadcast by the second transceiver unit, that the second transceiver unit will accept the transmission from the first transceiver unit. For example, the first TU 112 can receive a CTS message broadcast or other acceptance message from the third TU 116. The first TU 112 can determine, based on the CTS message from the third TU 116, that the third TU 116 will accept the transmission from the first TU 112.

At block 208, the first transceiver unit can precode data using the set of selected precoding weights in response to the determining (block 206) that the second transceiver unit will accept the transmission from the first transceiver unit. For example, the first TU 112 can precode the first signal 122 using the set of selected precoding weights indicated in the RTS message (block 204). In some embodiments, the CTS message broadcast by the second transceiver unit (e.g., the third TU 116) can further include one or more channel quality indicators. As such, the first transceiver unit (e.g., the first TU 112), can determine, based on the channel quality indicators included in the CTS message, one or more parameters to apply to the transmission to the second transceiver unit (e.g., the third TU 116). The one or more parameters can include, for example, a modulation order and a code rate based on a predicted SNR.

At block 210, the first transceiver unit can transmit the precoded data to the second transceiver unit using the antennas corresponding to the set of selected precoding weights. For example, the first TU 112 can transmit the precoded first signal 122 to the third TU 116.

Figure 3:
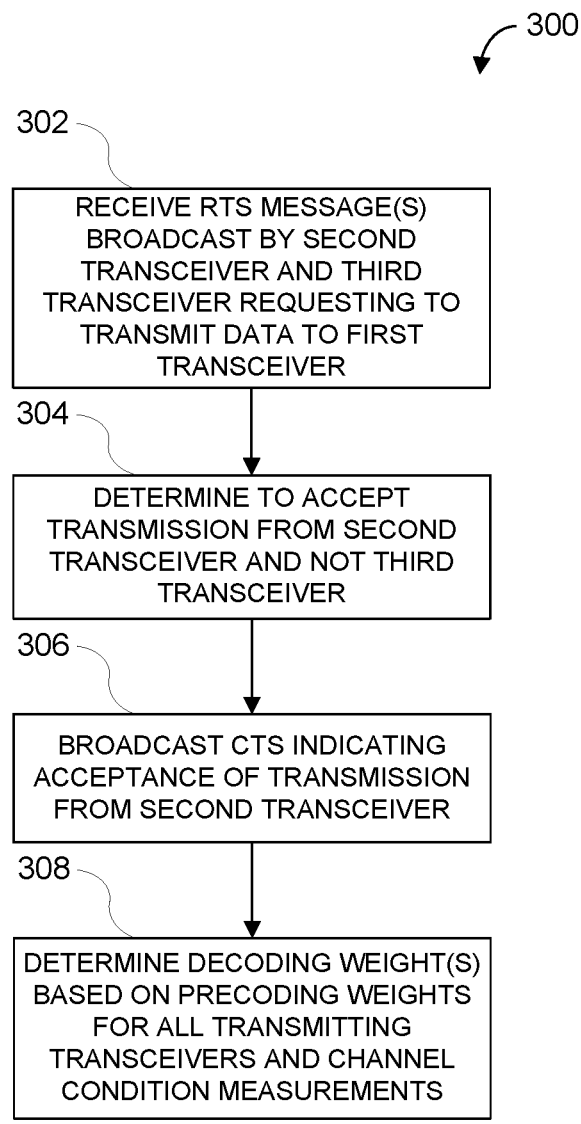
FIG. 3 is a flowchart of another embodiment of a method for data communication.

FIG. 3 is a flowchart of another embodiment of a method for data communication. A method 300 can be performed by one or more transceiver units (e.g., the first TU 112, the second TU 114, the third TU 116, and the fourth TU 118) in the network environment 100.

At block 302, a first transceiver unit can receive one or more RTS messages broadcast by a second transceiver unit and a third transceiver unit requesting to transmit data to the first transceiver unit. For example, both the first TU 112 and the second TU 114 may broadcast RTS messages requesting to transmit data to the third TU 116. In some embodiments, the RTS messages broadcast by the first TU 112 can have the sets of precoding weights selected by the first TU 112, as described in connection with FIG. 2. The RTS messages broadcast by the second TU 114 can have the set of precoding weights selected by the second TU 114. As noted above, the precoding weights can be selected based on one of a number of processes. Precoding weights can be selected based on an arbitrary process, a random process, a pseudo-random process, a non-random process, or deterministic selection process. In some embodiments, the process can be a predetermined process.

At block 304, the first transceiver unit can determine to accept a transmission from the second transceiver unit and not a transmission from the third transceiver unit. For example, when multiple transceiver units (e.g., both the first TU 112 and the second TU 114) attempt to transmit to the third TU 116, the third TU 116 may resolve the conflict as to which transmission to accept by using a random, pseudo-random, or deterministic process or other algorithm as described above in connection with FIG. 2. For example, the third TU 116 can determine to accept the transmission from the first TU 112 and not the transmission from one or more other TUs (e.g., the second TU 114) based on one or more of a random number, a priority, and a predicted SNR. In some examples, the transceiver unit with information ready for transmission can select a random number and include the random number in the RTS or other request message. If there are two or more transceiver units with information to transmit to the same receiver (e.g., one of the TUs), the receiver can choose the one with, for example, the largest random number. If the random numbers turn out to be equal (this is infrequent but mathematically possible), the receiver can select, for example, the lowest identifier. In some embodiments, a MAC address can be used as such an identifier. For example, the receiving TU can select the lowest (or highest) MAC. This process can be modified by allowing an indication of priority levels so that the highest priority transmission can be preferred over lower priorities. The receiver can also determine that the SNR expected for a given transmitter (e.g., one of the TUs) is too low, in which case an alternative transmitter (or no transmitter) can be selected.

At block 306, the first transceiver unit may broadcast a CTS message indicating an acceptance of the transmission from the second transceiver unit, in response to determining to accept the transmission from the second transceiver unit and not the third transceiver unit. For example, the third TU 116 may broadcast a CTS message indicating that the third TU 116 will accept the transmission from the first TU 112 but not the transmission from the second TU 114.

At block 308, the first transceiver unit can determine one or more decoding weights based on the sets of selected precoding weights for all transmitting transceiver units (e.g., the second transceiver unit), and channel condition measurements. The decoding weights can be based on the identity of the transmitting TUs. For example, the third TU 116 can determine one or more decoding weights based on the sets of selected precoding weights for the first TU 112 (and any other transmitting TUs in the network environment 100) but not the second TU 114 (or any other non-transmitting TUs in the network environment 100). The third TU 116 can further consider channel condition measurements when determining the one or more decoding weights. In some examples, the identities of the transmitting TUs can be determined from the received broadcast CTS messages.

In various embodiments, a transceiver unit (e.g., the first TU 112, the second TU 114, the third TU 116, and the fourth TU 118) can select decoding weights reflecting the intended signal (e.g., the first signal 122 or the second signal 124) while minimizing interference from other transmitting transceiver units (e.g., the first interference signal 132, the second interference signal 134). For example, a zero-forcing algorithm or a minimum mean square error (MMSE) method may be applied in order to determine the appropriate decoding weights.

In some embodiments, to apply the zero-forcing algorithm, a transceiver unit can determine decoding weights by solving for decoding weights $\vec{D}_i$ in the following equation (1):

$$\vec{D}_i^T H_{ij} \vec{P}_j = \delta_{ij} = \begin{cases} 1 & i = j \\ 0 & i \neq j \end{cases} \quad (1)$$

In some other embodiments, the MMSE method may be used to minimize the error in the received first signal 122 ($E_{rs}$) at a receiving transceiver unit (e.g., the third TU 116), as defined in equation (2) below, given known values for precoding weights $\vec{P}_j$ and channel condition measurements $H_{ij}$. With known values for $\vec{P}_j$, the derivatives of $E_{rs}$ over the decoding weights $\vec{D}_i$ are linear equations and may be derived with minimal computational complexity. In various embodiments, although MMSE solutions may be biased, the bias may be removed by multiplying $\vec{D}_i$ by a constant that renders $\vec{D}_i^T H_{ij} \vec{P}_j = 1$.

$$E_{rs} = \Sigma_i \Sigma_j |\vec{D}_i^T H_{ij} \vec{P}_j|^2 + 2\sigma^2 \Sigma_i \|\vec{D}_i^T\|^2 - 2\mathrm{Re}(\Sigma_i \vec{D}_i^T H_{ii} \vec{P}_i) + K \quad (2)$$

Figure 4:
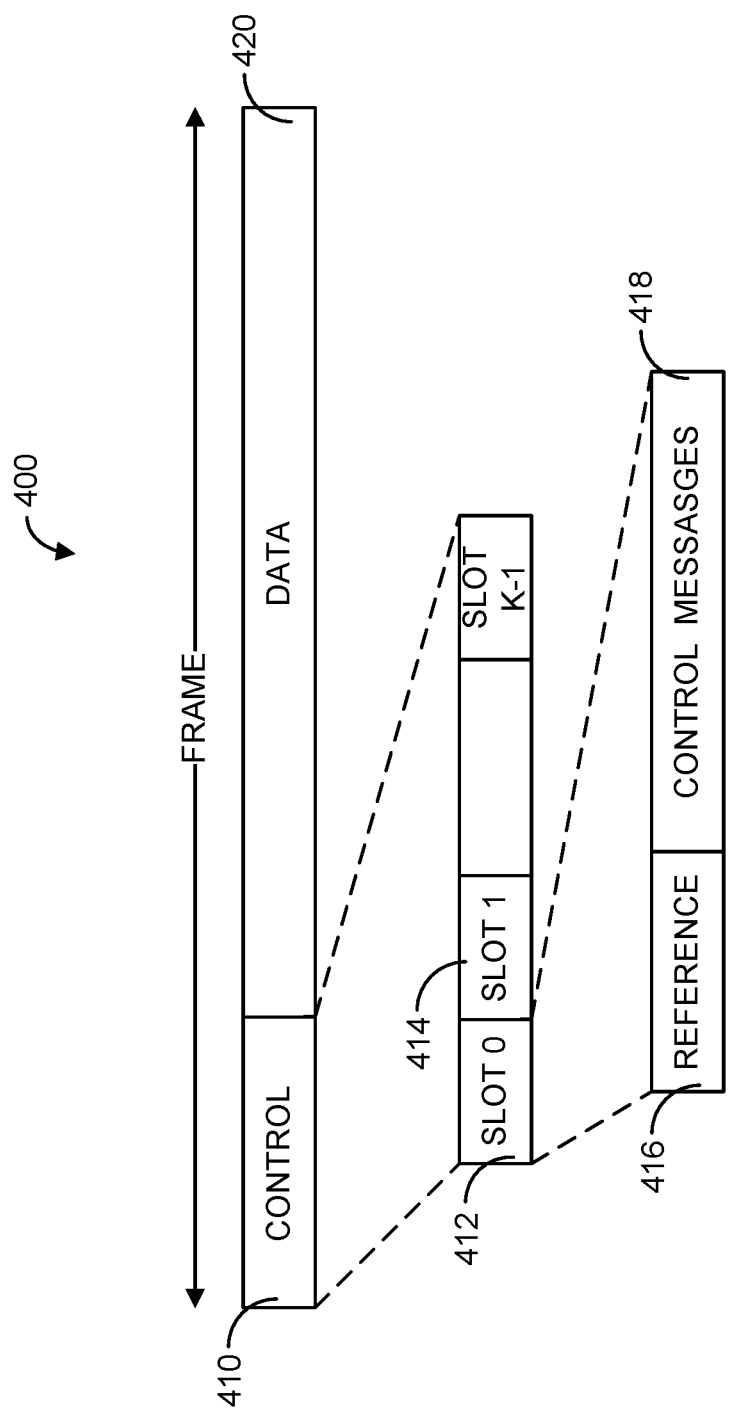
FIG. 4 is a graphical representation of a data frame.

FIG. 4 is a graphical representation of a data frame. A frame 400 can be implemented as part of a link level protocol used for transmissions amongst multiple transceiver units in the network environment 100 (FIG. 1). For example, the frame 400 can be implemented as part of the link level protocol used for transmissions amongst the first TU 112, the second TU 114, the third TU 116, and/or the fourth TU 118.

In some embodiments, the transmission between multiple transceiver units can be divided into frames (e.g., the frame 400) within the time domain, each frame having a predefined length. The frame 400 can have a control sub-frame 410 and a data sub-frame 420. The frame control sub-frame 410 can have broadcast information including antenna reference signals plus the RTS/CTS and other control messages. The data sub-frame 420 can have, for example, unicast signals holding user data transferred from transceiver unit to transceiver unit. In some embodiments, the data sub-frame 420 can be divided into multiple time slots such that transmissions between more than one pair of transceiver units may be scheduled during a single instance of the frame 400.

According to one exemplary embodiment, the control sub-frame 410 can be divided into a plurality of TDMA slots including, based on a time division multiple access (TDMA) protocol. For example, the control sub-frame 410 can be subdivided into a first slot 412 and a second slot 414. Each TDMA slot included in the control sub-frame 410 can be assigned to a transceiver unit (or antennas) in the network environment 100. For example, the first TU 112 can be assigned the first slot 412 and the second TU 114 may be assigned the second slot 414. Additional slots can be assigned to other transceiver units in the network environment 100.

In some embodiments, the first slot 412 can have a reference field 416 and a control message field 418. The reference field 416 can have one or more reference symbols for each antenna in a transceiver unit. In some embodiments, RTS and CTS messages broadcast by transceiver units (or different antennas) in the network environment 100 can be conveyed in the control sub-frame 410. The exchange of RTS and CTS messages in the control sub-frame 410 may resolve conflicts in instances where the number of transceiver units requesting to transmit data (e.g., to another transceiver unit) exceeds a maximum number permitted based on network configuration.

For example, when the first TU 112 attempts to transmit data to the third TU 116, the first TU 112 can broadcast an RTS message in the first slot 412 of a first frame (e.g., the frame 400). The third TU 116 can receive multiple RTS messages broadcast by different TUs (e.g., the first TU 112 and the second TU 114), each RTS message indicating a request to transmit data to the third TU 116. The third TU 116 can then determine (e.g., based on a pseudo-random algorithm) to accept the transmission from one of the TUs, from for example the first TU 112. Accordingly, in such an example, the third TU 116 would implicitly not accept the transmission from the second TU 114. As such, the third TU 116 can broadcast a CTS message in the second slot 414 of a subsequent second frame (e.g., the frame 400). Such a CTS can indicate that the first TU 112 is clear to send its traffic. In response to receiving the CTS message broadcast by the third TU 116, the first TU 112 can then transmit data to the third TU 116 in the data sub-frame of the same second frame 400.

In some embodiments, the transmissions amongst the transceiver units in the network environment 100 can be modulated using orthogonal frequency division multiplexing (OFDM) or single-carrier frequency division multiplexing (SC_FDM). As such, channel condition measurements can include a single complex number for each antenna and sub-carrier. Moreover, the transmissions can be synchronous and time based, for example, on an external timing source (e.g., global positioning system (GPS)), or by self-synchronization. In at least one exemplary embodiment, a transmission protocol may be time division duplex (TDD). As such, since both uplink and downlink transmissions share the same channel, each transceiver unit may be aware of other transceiver units in the network environment 100.

In some embodiments, the method 200 and the method 300 in use with the frame 400 can provide improved IA communications within the network environment 100. For example, the only channel information that the first TU 112, the second TU 114, the third TU 116 and the fourth TU 118 need to be obtained is that which is available at the TUs as receivers, derived from reference signals transmitted by the other TU transmitters within the communication environment. Accordingly, in some embodiments, there is no need to exchange channel measurements with other participants (e.g., the TUs) within the network environment 100. In some other embodiments, transmit and receive scheduling can be determined by an exchange of messages between the affected participants (e.g., the TUs) without any centralized control. Additionally, gain calculations can be accomplished at each TU autonomously, without need for negotiation with other network participants.

In some embodiments of the proposed method, each TU in the network environment 100 can select the precoding weights for each transmitter's antennas, changing the precoding weights for each successive transmission. In some embodiments, the selection of the precoding weights can be an arbitrary, random, pseudo-random, non-random, or deterministic selection process. In some other embodiments, the selection process can be predetermined at any time before the selection of the precoding weights. This arrangement can avoid a need for transmitters to obtain channel information from the receivers. The chosen or selected precoding weights are sent to all receivers in the RTS messages according the method 200, the method 300, and the frame 400, as described herein.

Figure 5:
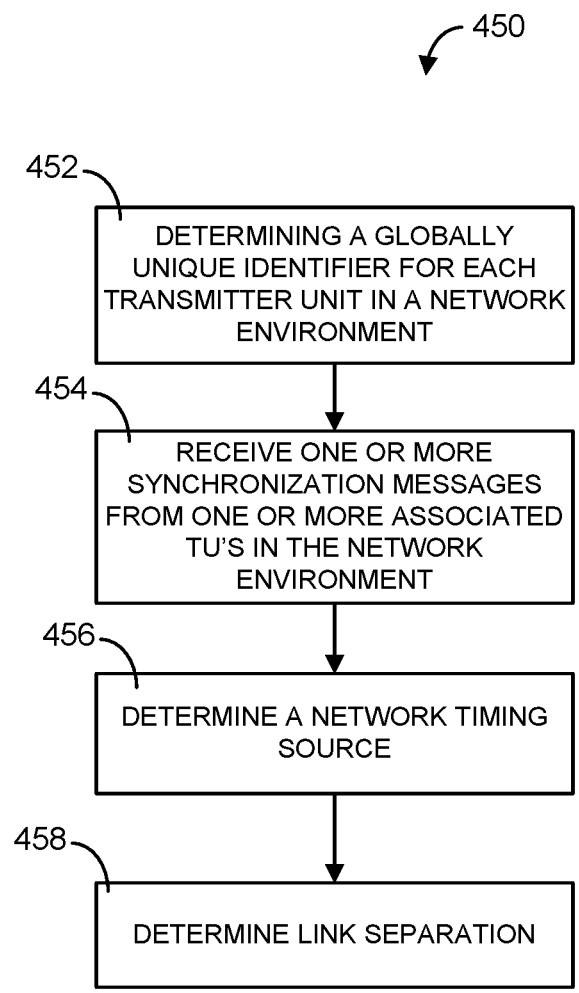
FIG. 5 is a flowchart of a method for operating the network environment of FIG. 1.

FIG. 5 is a flowchart of an embodiment of a method for operating the network environment of FIG. 1. A method 450 can provide a process for network synchronization of a TU entering the network environment 100 (entering unit), for example. The method 450 can further provide an extension to the methods/protocols described in connection with FIG. 2 and FIG. 3 to provide a common timing reference, and thus enable decentralized network timing. Reference is made to a "network timing source" and a "unit timing source" throughout this disclosure. As used herein, a network timing source is the source of timing for the entire network 100. A unit timing source, on the other hand, is the source of network time that an individual unit (e.g., a TU) uses for a timing reference. In a fully-connected network in which every TU is in communications with every other TU, the network timing source and the unit timing source can be the same TU. However, in a distributed network, the unit timing source of the first TU 112, for example, may be one or more network links or steps away from the network timing source. For a given network environment 100, there may generally only be one network timing source. However, individual TUs can have individual unit timing sources, based on link separation from the network timing source.

At block 452, each TU in the network environment 100, and the entering unit in particular, can determine a unique address or identifier. The globally unique identifier may also be referred to herein as a UUI (unique unit identifier). In general, each network unit in the network (e.g., each transmitter unit in the network environment 100, as used herein) can be assigned or determine a globally unique identifier or UUI. The globally unique identifier can be, for example, a medium access code/control (MAC) address. Other examples include Electronic Serial Number (ESN) and International Mobile Equipment Identifier (IMEI). This allows unique identification of a transmitter unit regardless of network.

At block 454, the entering unit can receive one or more synchronization messages from associated TU's within (e.g., already established with) the network environment.

Each TU in the network environment 100 can periodically transmit (e.g., broadcast) a synchronization message. The synchronization message can include at least's the UUI, link separation (e.g., from the network timing source), and timing. In some embodiments, the synchronization message can also include an in-use field for NSIDs for the NSID selection function, indicating which NSIDs are in use. In some embodiments, the entering unit can listen for one or more listening periods. The listening period can be a predetermined amount of time. The listening period should be long enough to ensure that all synch messages are received. For example, if the synchronization messages are transmitted periodically by all TUs, the listening period should be greater than the transmission period.

If one or more synchronization messages is received at the entering unit, the transmitter units in the network environment 100 can determine which of the transmitter units should serve as the network timing source. The network timing source can be the transmitter unit (within the network environment 100) that is designated to provide the basis for network timing. In some embodiments, timing can be set using a physical layer (PHY) signal such as a preamble, midamble, or a reference signal. In that context, timing can be referred to as "frame timing." In some embodiments, the global address can be represented as an ordered collection of bits, having a defined most-significant bit (MSB). Thus, a comparison can be made using the conversion of the bits to a number to determine the global address having the lowest (or highest) value. In some embodiments, the network timing source can be the transmitter unit with lowest global address or UUI (e.g., lowest number). Other methods can also be implemented to determine which of the first TU 112, the second TU 114, the third TU 116 and the fourth TU 118 should be selected or designated as the network timing source.

In some embodiments, the identities of each TU present can be shared among the units via, for example, broadcast messages (e.g., transmitted in a synchronous or asynchronous manner), as random-access transmissions, or as part of control messaging with synchronized timing. Broadcast and random-access methods may be needed when timing has not been established or when units are in merging subnetworks having different network timing sources. This determination can be made as the transmitter units of the network environment 100 interact or send messages amongst one another. When each of the TU's (e.g., the first TU 112, the second TU 114, the third TU 116 and the fourth TU 118) is aware of the presence of the other TU's, the smallest or largest globally unique identifier may be mutually known, and in some embodiments, the associated TU can be acknowledged by the rest of the TUs in the network as the network timing source.

At block 456 the entering TU can set its network timing to reference the timing of the unit timing source (e.g., TU) which may be chosen as the unit having the lowest separation from the network timing unit. In the event of a tie between network separation counts of two different TU's transmitting synchronization messages (e.g., unit separations are the same), the initial synchronization unit may be set to the unit with the lowest UUI. This synchronization is considered "initial" here as synchronization may periodically change with changing network conditions and network membership, as described below in connection with FIG. 6. The transmitter unit with the determined lowest/highest number can thus serve (or begin serving) as the network timing source and basis for the timing within the network environment 100.

In some embodiments, the method 450 can allow information sharing across all connected units within the network environment 100, for example, by various types of messaging (e.g., broadcast). This information can include, for example, the identity of the sender (e.g., using the globally unique identifier from block 452), the identity of the TU serving as the network timing source (e.g., the network timing source determined at block 456), and a separation count between the transmitting TU and the network timing source. As used herein, the separation count is a number of network links between the transmitting TU and the network timing source. For example, the separation count could be zero if the transmitting TU is the network timing source. In addition, the separation count cannot exceed one less than the maximum number of units allowed in the network environment 100.

At block 458, the entering unit can determine link separation (separation count) from the network timing source and from other adjacent TU's in the network environment 100. For example, the entering unit can set initial separation to one more than the separation of the TU used for initial synchronization, also termed the unit timing source. That is, the entering unit can assume that it is at least one step further away from the network timing source than its unit timing source. The entering unit can further set a slot timing to that of the unit timing source.

If the entering unit's UUI is lower than the UUI of the network timing source, the entering unit can set its unit timing source to the entering unit (i.e., its own) UUI and set the separation count to zero. That is, the entering unit uses its own clock as the unit timing source and assumes the role as the network timing source. If the entering unit's UUI is not lower than the UUI of the unit timing source, the entering unit can set its network timing source UUI to the network timing source UUI of the initial unit timing source and set the separation count to that of the unit timing source plus one.

In some embodiments, the entering unit can then send the synchronization message. After sending the synchronization message, the entering unit can establish a network-specific identifier (NSID) used to send and receive data on the network. If, after a predetermined or otherwise user-defined period, the entering unit does not receive any synchronization messages from other units within the network environment 100, the entering unit can set the synchronization UUI to its own UUI, set the separation to zero, and set the slot timing according to its own clock, acting as the network timing source. The entering unit can then transmit synch messages once per synch message cycle and wait for others to join the network.

Figure 6:
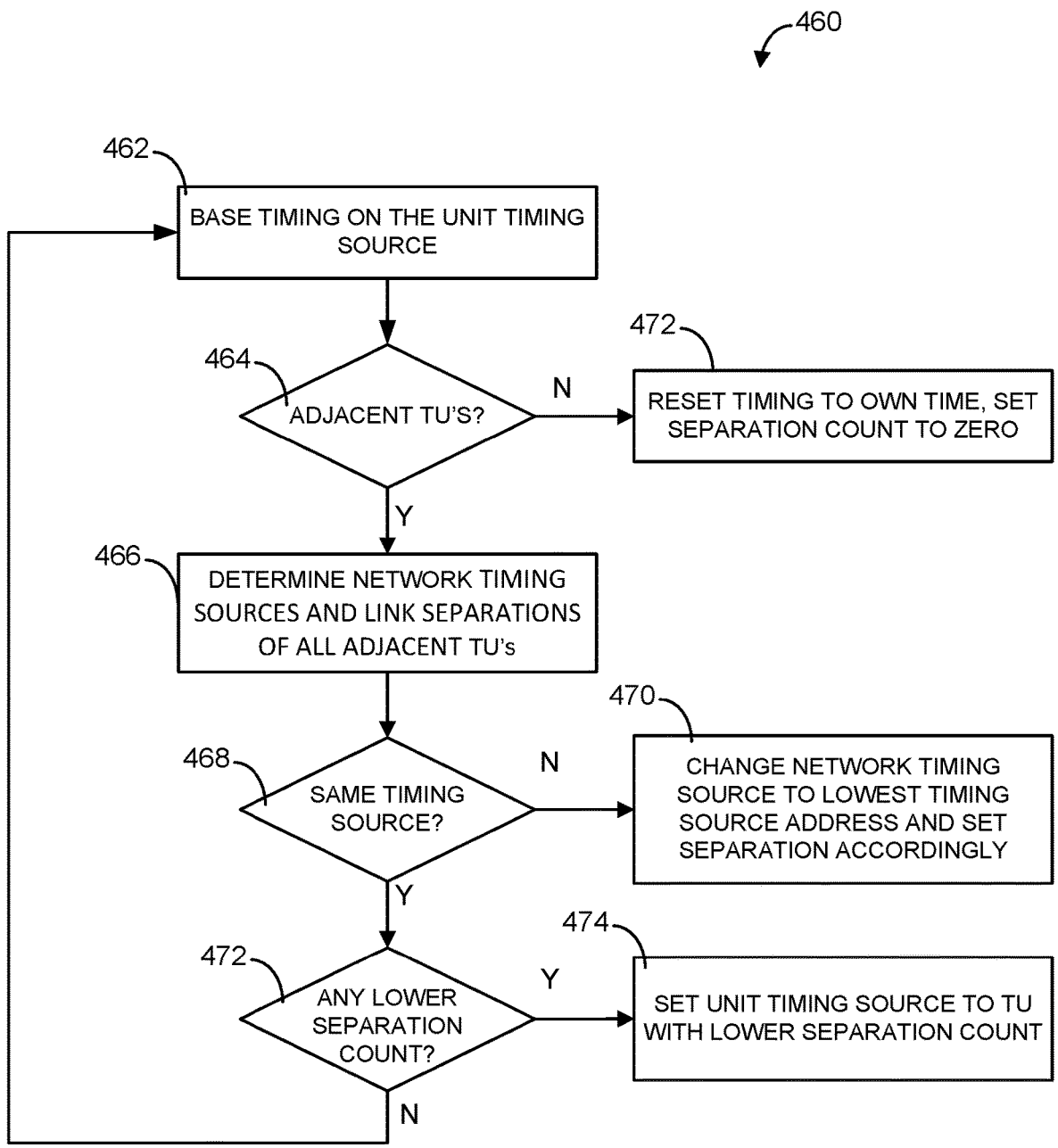
FIG. 6 is a flowchart of a method for operating the network environment of FIG. 1.

FIG. 6 is a flowchart of an embodiment of a method for operating the network environment of FIG. 1. In the event of a change in network membership (e.g., departure of a TU from the network) or a change in network topology or connectivity, a method 460 can provide a process for detecting the change and, if necessary, changing the identity of the network timing source and thus the identity of the unit providing the timing basis for the network. The network topology or connectivity can change, for example, if one or more of the TU's in the network environment 100 move in relation to one another or leave the network altogether. As TUs move within the network environment 100, the identity of various unit timing sources can also vary with variations in link separation. There is only one network timing source, but individual TUs can have individual unit timing sources, based on link separation.

At block 462, a given TU (e.g., the first TU 112) can base its network timing on the unit timing source as determined in the method 450, for example, based on periodic messaging, broadcast messages, and/or synchronization messages. In some other examples, the first TU 112 can set timing based on other reference components (preamble, reference resource elements, etc.) in the (broadcast) signals transmitted by the unit timing source. Some embodiments may also include a time stamp (e.g., UTC, frame number) in the transmitted signals.

At decision block 464, the first TU 112 can determine whether there are any adjacent (e.g., near or next to) TU's present based on the messages. For example, the second TU 114 is adjacent to the first TU 112. Adjacent, in this context, means that there is a link between the transmitter units. This excludes relays in which two links are used to pass information between two units (e.g., A to B to C; A and C are not adjacent). If there are adjacent TU's then the method can proceed to block 466.

At block 466 the first TU 112 can determine the respective unit timing sources and separation counts (from the network timing source) of all of the adjacent TU's in the network environment 100. This can be performed by receiving periodic broadcast or synchronization messages. The synchronization messages from the other TUs in the network 100 can include a link separation of each respective TU from the network timing source. For example, the first TU 112 can detect that an adjacent TU (e.g., the second TU 114) has a network timing source that is inconsistent with its own (that of the first TU 112). In some embodiments, this can mean that the second TU 114 is operating with a network timing source that is different, older, or newer than that upon which the first TU 112 is relying.

At decision block 468, the first TU 112 can determine whether the network timing source for the second TU 114 is the same one in use by the first TU 112.

At block 470, if the network timing source in use by the second TU 114 is not the same (at decision block 468), then the first TU 112 can change its network timing source to that of the TU having the lowest network timing source UUI. TU 112 can then set its separation count to one more than the lowest separation over all received TUs having the same network timing source.

At decision block 468, if the network timing source of the second TU 114 is the same as the first TU 112, then at decision block 472 the first TU 112 can determine whether there is a TU using the same network timing source with a lower separation count than the first TU 112 is referencing.

At decision block 472, if the first TU 112 detects an adjacent TU having the same network timing source with a lower separation count, then at block 474, the first TU 112 can use the TU as a unit timing source and set the separation count to one more than that of the unit timing source.

In some embodiments, the all of the TUs can reset their respective separation counts to one more than the lowest separation received in the broadcast messages from their respective unit timing sources. In some embodiments, not all of the TUs change their network and unit timing sources at the same time, as this can generally be a local process. Each TU can perform this process periodically, so a change in network timing source can gradually propagate through the network. The separation count or setting is based on the unit timing source's separation from the network timing source, and only is set/reset at one TU at a time or at a subset of TUs at a time.

At decision block 472, if there are no TU's with a lower separation count, then the method 460 can return to block 462.

If at decision block 464, there are no adjacent TU's, the first TU 112 can set its unit and network timing sources to its own identity and the link separation to zero. In such an embodiment, the first TU 112 can become its own unit timing source and network timing source.

In the case where the TU serving as network timing source is no longer connected to the network 100, the separation counts may increase until the separation count limit, a maximum allowable separation, or some established threshold is exceeded for at least one TU. In some cases the separation count threshold may be one less than the total number of TUs allowed in the network 100. In such an event, the steps of the method 450 and the method 460 can be implemented by the network 100 and ultimately settle on a new network timing source. In some other cases, the separation threshold or maximum allowed separation can also be defined as the number of TUs allowed in the network.

In some embodiments, the TU serving as the network timing source may leave the network 100. This event can be detected by TUs that could previously receive traffic (messages) from the TU serving as the network timing source. In some examples, this situation can be deceptive, since it is possible that more than one TU may continue to receive from the TU serving as the network timing source, and not all TUs lose connectivity to that UUI.

Figure 7:
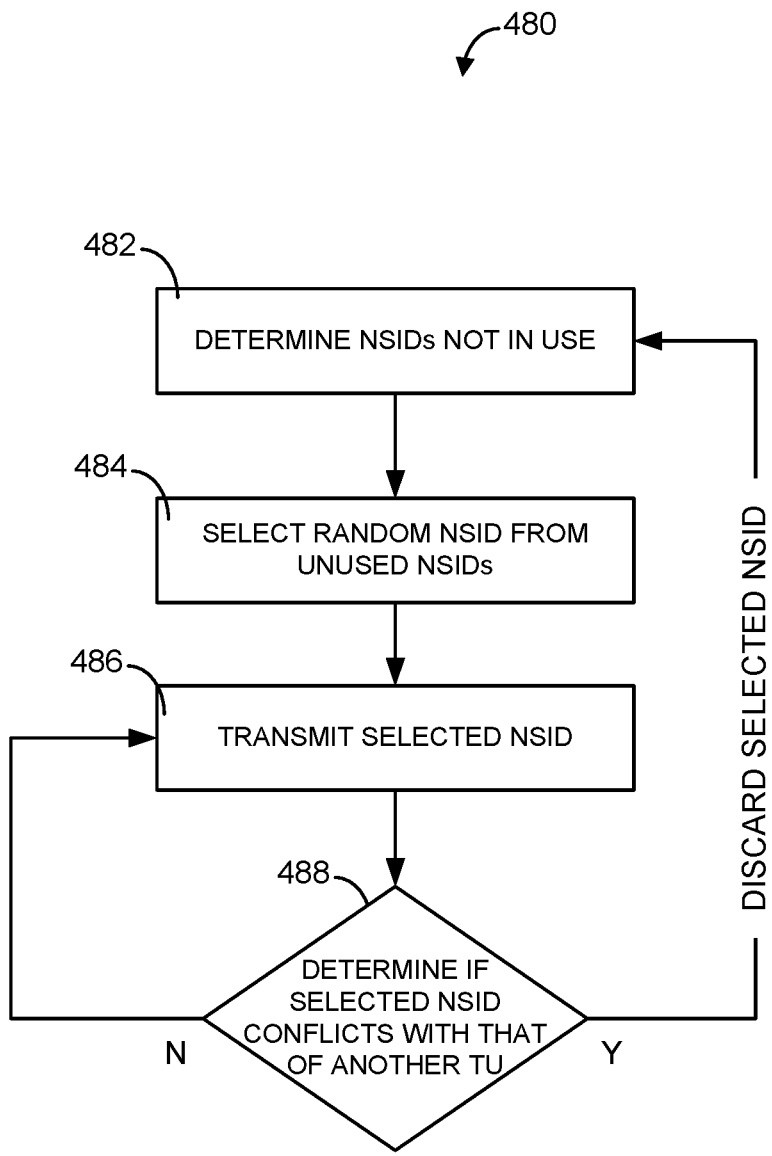
FIG. 7 is a flowchart of an embodiment of a method for operating the network environment of FIG. 1.

According to the separation update rules in connection with the method 460, if the network timing source is still connected to the network 100, the TUs within the network 100 can adjust their respective separation counts/values to reflect the new network topography, but network or communication throughput should not be affected. FIG. 7 is a flowchart of an embodiment of a method for operating the network environment of FIG. 1. A method 480 provides a method for deconflicting NSIDs among TUs. There are only as many NSIDs as the maximum number of units allowed in the network. The NSID determines the timing of the transmission of overhead messages, including RTS and CTS, and a collision will occur if any two adjacent units have the same NSID. The method 480 provides for NSID determination in a decentralized manner, including the following method steps.

During normal operation, the TU's of the network environment 100 can monitor the NSID selections of adjacent TU's. At block 482, one or more of the TU's can determine which NSIDs are not in use. Depending on the size of the network or number of units within the network environment 100, this can be a very large group of NSIDs.

At block 484, each TU can select a random NSID from unused NSIDs.

At block 486, each TU can transmit its own selected NSID in connection with a broadcast synchronization message.

At decision block 488, one or more TU can detect an NSID conflict between two TU's or that an NSID is in use by more than one individual TU in the network environment 100. The first TU 112, for example, can receive a message from the second TU 114 indicating that the second TU 114 has the same NSID as the first TU 112. Alternatively, the first TU 112 can receive messages from the second TU 114 and the third TU 116 indicating both TU's have the same NSID. Other NSID conflicts are possible.

If a conflict between NSIDs is detected at decision block 488, then the first TU 112 can return to block 482 of the method 480. At the same time, the first TU 112, can discard the previously selected (conflicting) NSID and consider the discarded NSID as not in use. The first TU 112 can determine NSIDs not in use (at block 482), and at block 484 select a new NSID (which may be the same as the discarded NSID) at random from NSIDs not observed in use within the network environment 100. In some embodiments, the first TU 112 can also maintain a memory of the NSIDs determined to conflict with network membership. Referencing such a memory for conflicting NSIDs can prevent later selection of a conflicting NSID.

The TU's of the network environment 100 can all perform the method 480 during a number of synchronization listening periods and eventually settle on a set of NSIDs that do not conflict. This can occur provided that enough NSIDs are available for all network units (e.g., the TU's). If not, then one or more of the excess TU's may be forced to leave the network.

In some embodiments, every TU within the network may not select a unique NSID. For example, the NSIDs may only be unique within a conflict range. A conflict range in this sense can refer to a separation of multiple network links. For example, the conflict range should be large or far enough so that no intermediate TUs experience (receive) and report the conflict. Two network links (e.g., A to B to C) is insufficient since the TU in the middle (e.g., B) will see that A and C claim or are using the same NSID, and will report a conflict. In some embodiments, four TUs having three network links between them (e.g., A to B to C to D) can provide sufficient conflict range in the event A and D use the same NSID; B and/or C may not experience and report the conflicting NSID. Therefore in some embodiments, a conflict range of three or more links can prevent intermediate TUs from receiving and reporting the conflicting NSID. Thus, it may be possible that two TUs that are separated by four or more network links may have the same NSID. However, the separation can prevent message collisions or confusion. This can allow duplication of NSIDs. In one example, a very long string of singly-connected TUs could have the same NSID in use by two TUs without conflict. However, as the TUs move in space, conflicts may be revealed and subsequently corrected.

Thus, in some embodiments, it may be possible for changes in network topology to reveal conflicts that were not apparent prior to the change. For example, two subnetworks within the network environment 100, which were not previously connected, may become connected, revealing an NSID conflict. When such events happen, the method 480 can allow the TU's present to adjust NSID choices for all units in conflict, with adjustments occurring until all conflicts are resolved. Once the network achieves a conflict-free assignment of NSIDs to all units in the network, no further changes will occur unless there is a change in the units participating in the network.

Figure 8:
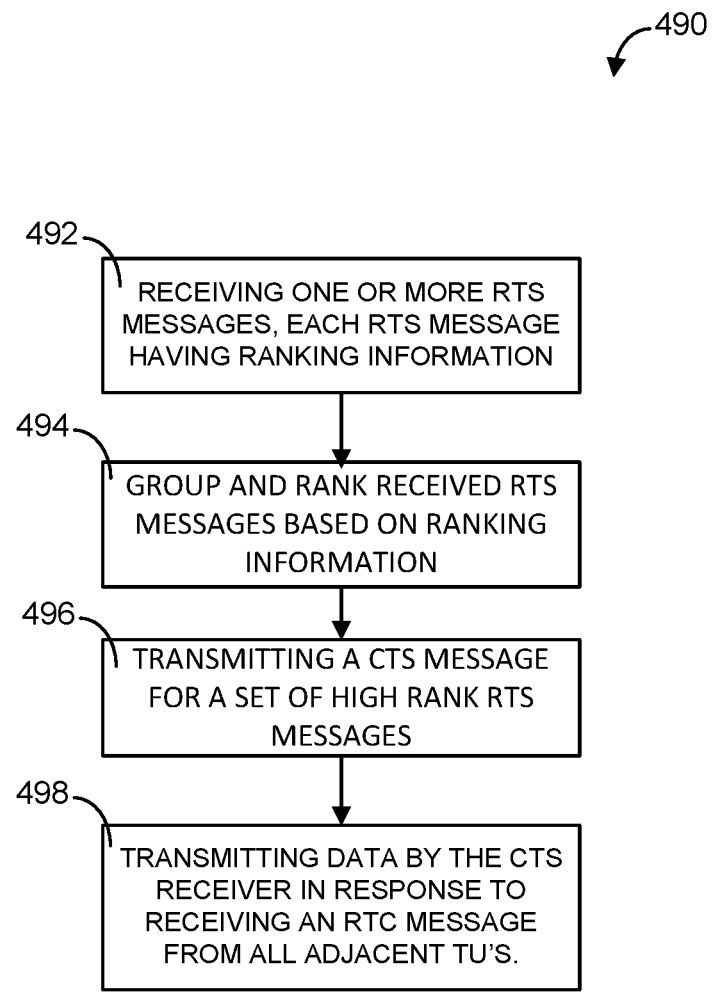
FIG. 8 is a flowchart of an embodiment of a method for operating the network environment of FIG. 1.

FIG. 8 is a flowchart of an embodiment of a method for operating the network environment of FIG. 1. A method 490 may be related to the method 200 and the method 300 and may incorporate the use of RTS/CTS protocols. The method 490 can allow interference alignment to function properly when the network is not fully connected, that is when a portion of the TU's of the network environment 100 are connected to only a subset of the other TU's.

At block 492, the first TU 112 can transmit an RTS, indicating a destination address (e.g., the second TU 114) and information (e.g., a random number) used to rank the RTS transmissions in a priority order. Thus, the second TU 114 can receive one or more RTS messages, each RTS message having ranking information.

At block 494, each TU in the network environment can monitor RTS messages from the adjacent TU's. The second TU 114 can group received RTS messages together with its own RTS (if any) and determine the subset of the RTS messages having highest rank, after resolving conflicts and limiting the number of transmissions to the maximum allowable for interference alignment. That is, the second TU 114 can group and rank received RTS messages based on ranking information. This number can be a network setting. For example, it can be less than or equal to the number of antennas per unit, which determines how many simultaneous transmissions can occur without interference. Such conflicts can include duplicate destination choices (e.g., more than one TU transmits to the same receiving TU) and conflicting send/receive (e.g., the first TU 112 transmits to the second TU 114, but the second TU 114 is also transmitting). Note that it may not be considered a conflict or collision for more than one unit (TU) to send at the same time; the purpose of interference alignment is to allow such a process to occur.

At block 496, the second TU 114 can transmit a CTS message for the TUs that transmitted the resulting high rank set of RTS messages received by the second TU 114, to each unit (e.g., transmitting a CTS message for a set of high rank RTS messages).

At block 498, TU 112 can transmit data (to the second TU 114) if it receives a CTS from all adjacent units, and its own RTS is in its highest rank RTS set. In some embodiments, multiple TU's (e.g., the first TU 112, and the second 114) can perform the same processing in parallel. For example, for data sent from first TU 112 to second TU 114, block 498 can refer to processing by TU 112, whereas the operations of blocks 492, 494 and 496 are performed by the second TU 114.

This can improve interference mitigation by allowing a CTS sent to a potential sender by more than one TU, only one of which is the intended receiver, and having the sender transmit only if CTS is received from all the TU's. The goal is elimination of conflicts while allowing multiple simultaneous transmissions using interference alignment.

Figure 9:
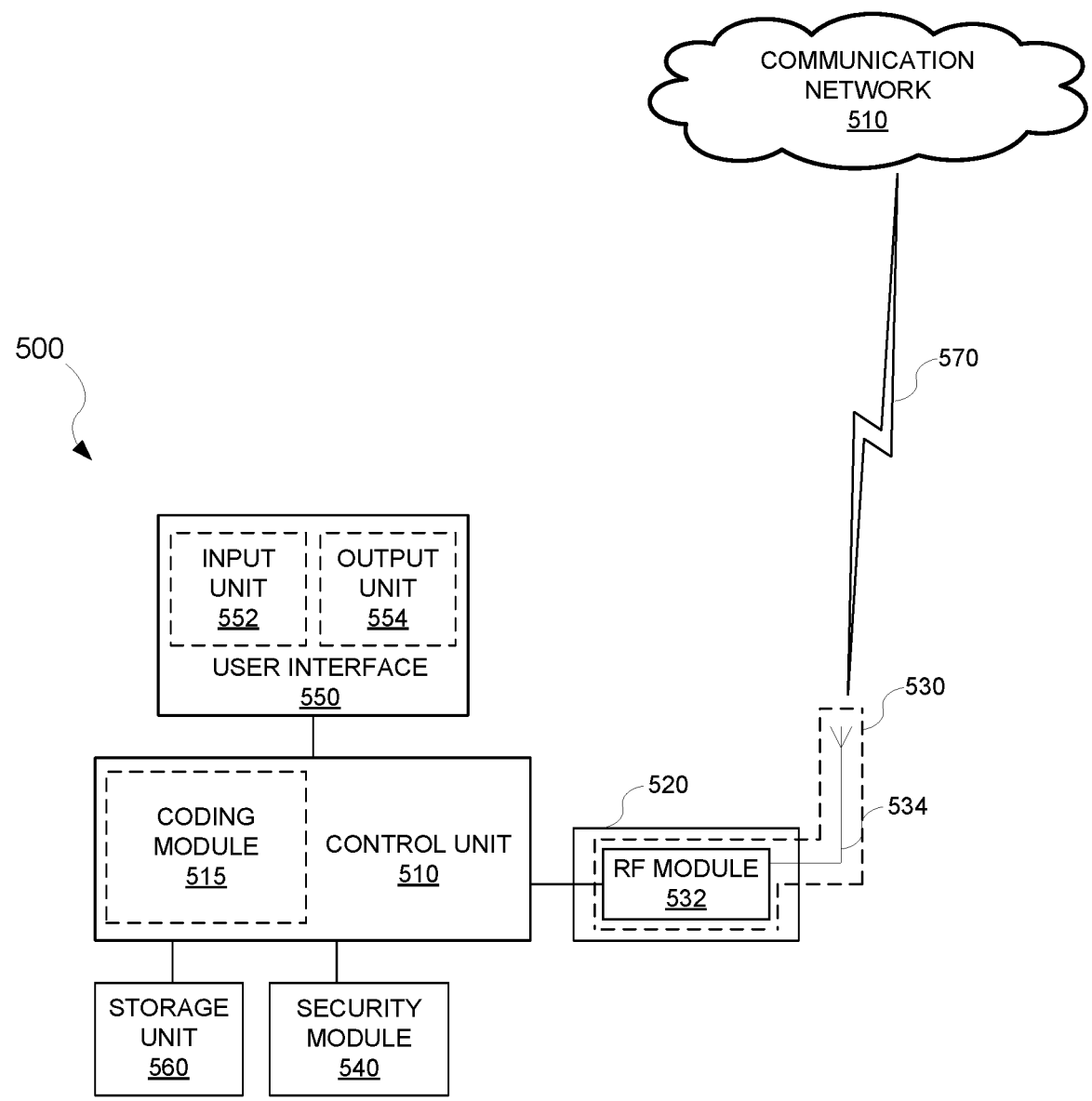
FIG. 9 is a functional block diagram of a transceiver.

FIG. 9 is a functional block diagram of a transceiver unit. A transceiver unit 500 can be implemented as the first TU 112, the second TU 114, the third TU 116, and the fourth TU 118 (FIG. 1). The transceiver unit 500 can have, among other things, a control unit 510. The control unit 510 can have a central processing unit (CPU), having one or more processors or microprocessors configured to control the operations of the transceiver unit 500. The control unit 510 can be coupled to a communication unit 520, a security module 540, a user interface 550, and a storage unit 560.

In some embodiments, the communication unit 520 can have a radio frequency (RF) chain 530. The RF chain 530 can have, for example, an RF module 532 and one or more antennas (antenna) 534. Although the transceiver unit 500 is shown to include a single communication unit (e.g., the communication unit 520), the transceiver unit 500 can have additional communication units without departing from the scope of the disclosure.

In some embodiments, the security module 540 can associate the communication unit 520 with a subscription 570 on a communication network 510. In some embodiments, the security module 540 can be a subscriber identity module (SIM) or other user identification device providing authentication services for a given network. The communication network 510 can support one or more radio access technologies (RATs), including, for example, WI-FI (IEEE 802.11b), wideband code division multiple access (WCDMA), Global System for Mobile Communications (GSM), Long Term Evolution (LTE), and time division synchronous code division multiple access (TD-SCDMA), or other wireless protocols as noted above. In some embodiments, the communication network can, for example, support communications between the first TU 112, the second TU 114, the third TU 116, and the fourth TU 118 of the network environment 100 (FIG. 1). Although the transceiver unit 500 is shown with a single security module 540 (e.g., a SIM), the transceiver unit 500 can have additional security module 540 (e.g., multiple SIMs) as required.

In some embodiments, the user interface 550 can have an input unit 552. In some embodiments, the input unit 552 may be, for example, a keyboard or a touch panel for receiving user input. The user interface 550 can have an output unit 554. The output unit 554 can be, for example, a liquid crystal display (LCD) or a light emitting diode (LED) display. In some embodiments, the user interface 550 may be optional. Accordingly, other types or forms of input units 552 and output units 554 can be used without departing from the scope of the disclosure.

In some embodiments, the control unit 510 can control the overall operation of the transceiver unit 500 including controlling the functions of the communication unit 520. The control unit 510 can have a coding module 515 configured to determine precoding and/or decoding weights for uplink transmissions from and/or downlink transmissions to the transceiver unit 500. The control unit 510 can be, for example, a microprocessor (e.g., general-purpose processor, baseband modem processor, etc.) or a microcontroller.

In some embodiments, the storage unit 560 can be one or more memory units operably coupled to the control unit 510 and configured to store application programs, application data, and user data. At least some of the application programs stored at the storage unit 560 can be executed by the control unit 510 for the operation of the transceiver unit 500.

Figure 10:
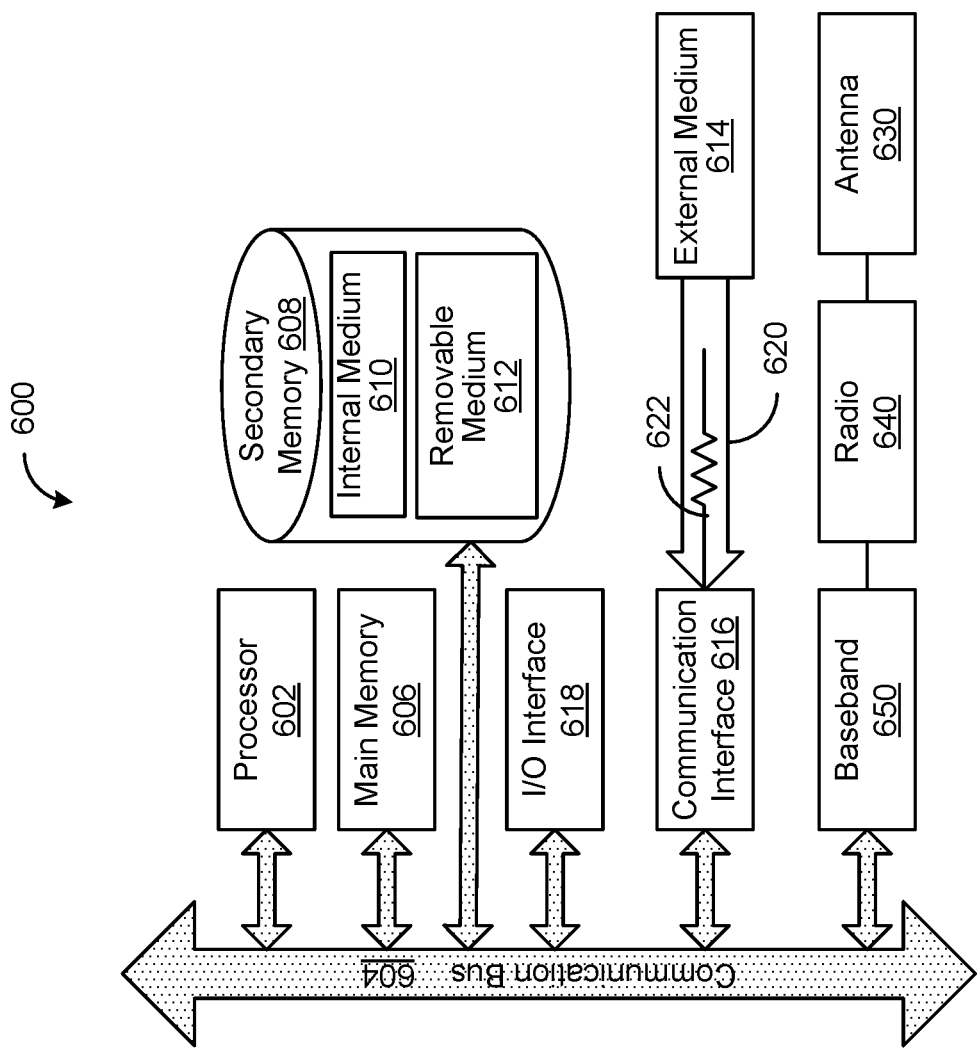
FIG. 10 is a functional block diagram of a communication system.

FIG. 10 is a functional block diagram of an embodiment of a communication system. A communication system (system) 600 can be a wired or wireless communication system coupling two or more transceiver units, such as, for example, the first TU 112, the second TU 114, the third TU 116, and/or the fourth TU 118. In some embodiments, the system 600 can be, for example, a personal computer, computer server, personal digital assistant, smart phone, tablet computer, or any other device or processor enabled device that is capable of wired or wireless data communication. In some embodiments, the system 600 can be a wireless communication device such as, for example, a MIDS/LINK-16 module or a RIFLEMAN radio, among other communication systems. Other computer systems and/or architectures can also be used without departing from the scope of the disclosure.

The system 600 can have a processor 602. The processor 602 can be implemented as one or more processors or microprocessors. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 602.

The processor 602 can be coupled to a communication bus 604. The communication bus 604 can have a data channel for facilitating information transfer between memory (e.g., the storage unit 560) and other peripheral components of the system 600. The communication bus 604 can also provide signals used for communication with the processor 602, including a data bus, address bus, and control bus (not shown). The communication bus 604 can have any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, VITA 49, and the like.

The system 600 can have a main memory 606. The system 600 can also have a secondary memory 608. The main memory 606 can enable storage of instructions and data for programs executing on the processor 602. The main memory 606 can be a semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 608 can have an internal memory 610 and/or a removable medium 612, for example a floppy disk drive, a magnetic tape drive, a compact disc ("CD") drive, a digital versatile disc ("DVD") drive, etc. The removable medium 612 can be, for example, a floppy disk, magnetic tape, CD, DVD, SD card, etc.

The removable storage medium 612 can be a non-transitory computer readable medium having computer executable code (i.e., software) and/or data stored thereon. The computer software or data stored on the removable storage medium 612 can be read into the system 600 for execution by the processor 602. The other storage media, such as, for example, the main memory 606 and the secondary memory 608 can also be embodied on non-transitory computer-readable media.

In some other embodiments, the secondary memory 608 can have other similar means for allowing computer programs or other data or instructions to be loaded into the system 600. Such means can include, for example, an external storage medium 614 and a communication interface 616. The external storage medium 614 can be, for example, an external hard disk drive or an external optical drive, or and external magneto-optical drive.

Other examples of secondary memory 608 can be semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage media 612 and communication interface 616, which allow software and data to be transferred from an external storage medium 614 to the system 600.

The system 600 can also have an input/output ("I/O") interface 618. The I/O interface 618 can facilitate input from and output to external devices. For example the I/O interface 618 can receive input from a user input device (e.g., the UI 550 of FIG. 7) keyboard or mouse and may provide output to a display. The I/O interface 618 can receive input from and deliver output to various alternative types of human interface and machine interface devices.

In some embodiments, the communication interface 616 can allows software and data to be transferred between system 600 and external devices (e.g. printers), networks, or information sources. For example, computer software or executable code can be transferred to system 600 from a network server via the communication interface 616. Examples of communication interface 616 include a modem, a network interface card ("NIC"), a wireless data card, a communications port, a PCMCIA slot and card, a universal serial bus (USB), an infrared interface, and an IEEE 1394 fire-wire, just to name a few.

The communication interface 616 can implement a variety of protocol standards, such as, for example, Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 616 can be in the form of electrical communication signals 622. These signals 622 can be provided to the communication interface 616 via a communication channel 620. In at least one embodiment, the communication channel 620 can be a wired or wireless network, or any variety of other communication links. The communication channel 620 can carry the signals 622 and can be implemented using a variety of wireless communication means including cellular phone link, wireless data communication link, radio frequency ("RF") link, or infrared link, just to name a few.

Computer executable code (i.e., computer programs or software) can be stored in the main memory 606 and/or the secondary memory 608. Computer programs can also be received via communication interface 616 and stored in the main memory 606 and/or the secondary memory 608. Such computer programs, when executed, enable the system 600 to perform the various functions of the present invention as previously described.

In this description, the term "computer readable medium" is used to refer to any non-transitory computer readable storage media used to provide computer executable code (e.g., software and computer programs) to the system 600. Examples of these media include main memory 606, secondary memory 608 (including internal memory 610, removable medium 612, and external storage medium 614), and any peripheral device communicatively coupled with communication interface 616 (including a network information server or other network device). These non-transitory computer readable mediums are means for providing executable code, programming instructions, and software to the system 600.

In an embodiment that is implemented using software, the software may be stored on a computer readable medium and loaded into the system 600 by way of removable medium 612, I/O interface 618, or communication interface 616. In such an embodiment, the software is loaded into the system 600 in the form of electrical communication signals 622. The software, when executed by the processor 602, preferably causes the processor 602 to perform the functions described herein.

The system 600 also includes optional wireless communication components that facilitate wireless communication over a voice and over a data network. The system 600 can also have an antenna system 630, a radio system 640, and a baseband system 650 to enable wireless communications. Each of the antenna system 630, the radio system 640, and the baseband system 650 can be coupled to the other components of the system 600 via the communications bus 604. In the system 600, radio frequency ("RF") signals are transmitted and received over the air by the antenna system 630 under the management of the radio system 640.

In some embodiments, the antenna system 630 can have one or more antennas and one or more multiplexors (not shown) that perform a switching function to provide the antenna system 630 with transmit and receive signal paths. In the receive path, received RF signals can be coupled from a multiplexor to a low noise amplifier (not shown) that amplifies the received RF signal and sends the amplified signal to the radio system 640.

In alternative embodiments, the radio system 640 can have one or more radios that are configured to communicate over various frequencies. In some embodiments, the radio system 640 can combine a demodulator (not shown) and modulator (not shown) in one integrated circuit ("IC") or modem. The demodulator and modulator can also be separate components. In the incoming path, the demodulator strips away the RF carrier signal leaving a baseband receive audio signal, which is sent from the radio system 640 to the baseband system 650.

If the received signal contains audio information, then baseband system 650 decodes the signal and converts it to an analog signal. Then the signal is amplified and sent to a speaker. The baseband system 650 also receives analog audio signals from a microphone. These analog audio signals are converted to digital signals and encoded by the baseband system 650. The baseband system 650 also codes the digital signals for transmission and generates a baseband transmit audio signal that is routed to the modulator portion of the radio system 640. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 630 where the signal is switched to the antenna port for transmission.

The baseband system 650 is also communicatively coupled with the processor 602. The processor 602 can be coupled to the main memory 606 and the secondary memory 608. The processor 602 can execute instructions (i.e., computer programs or software) that can be stored in the main memory 606 or the secondary memory 608. Computer programs can also be received from the baseband system 650 and stored in the main memory 606 or in secondary memory 608, or executed upon receipt. Such computer programs, when executed, enable the system 600 to perform the various functions of the present invention as previously described. For example, the main memory 606 can store various software modules (not shown) that are executable by processor 602.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

The accompanying claims and their equivalents are intended to cover such forms or modifications as would fall within the scope of the disclosure. The various components illustrated in the figures may be implemented as, for example, but not limited to, software and/or firmware on a processor or dedicated hardware. Also, the features and attributes of the specific example embodiments disclosed above may be combined in different ways to form additional embodiments, all of which fall within the scope of the disclosure.

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an," or "the" is not to be construed as limiting the element to the singular.

The various illustrative logical blocks, modules, method steps, and algorithm operations described in connection with the embodiments disclosed herein may be implemented as electronic hardware, computer software, or combinations of both. To clearly illustrate this interchangeability of hardware and software, various illustrative components, blocks, modules, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present inventive concept(s). In addition, the grouping of functions within a module, block, circuit, or step is for ease of description. Specific functions or steps can be moved from one module, block, or circuit to another without departing from the invention.

The hardware used to implement the various illustrative logics, logical blocks, and modules described in connection with the various embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in processor-executable instructions that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include random access memory (RAM), read-only memory (ROM), electrically erasable programmable read-only memory (EEPROM), FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects.

Thus, the claims are not intended to be limited to the aspects shown herein, but is to be accorded the full scope consistent with the language claims, wherein reference to an element in the singular is not intended to mean "one and only one" unless specifically so stated, but rather "one or more."

The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A method for communication in a network having a plurality of transceiver units, the method comprising:
   transmitting by each transceiver unit (TU) of the plurality of TUs, a first broadcast message including a unique identifier of a respective TU of the plurality of TUs transmitting the first broadcast message, and a network timing source identifier indicating the unique identifier of a TU upon which the respective TU relies for network time;
   receiving at the plurality of TUs, the first broadcast messages from one or more of the plurality of TUs;
   selecting, by each TU, a network timing source from among the plurality of TUs based on the unique identifiers and the network timing source identifiers, the network timing source serving as the timing source for communications within the network;
   transmitting by each TU, a second broadcast message having an indication of a link separation between the respective TU and the network timing source, the link separation indicating a number of links between the respective TU and the network timing source;
   receiving at each TU, the second broadcast messages from the other TUs of the plurality of TUs;
   resetting the link separation at each TU to one more than a lowest link separation received in the second broadcast messages; and
   determining that the network timing source is no longer available when the lowest link separation received exceeds a maximum allowable separation.

2. The method of claim 1, further comprising selecting the network timing source based on the network timing source identifier having the largest numerical value.

3. The method of claim 1, further comprising selecting the network timing source based on the network timing source identifier having a smallest numerical value among the plurality of unique identifiers.

4. The method of claim 1, further comprising determining a link separation for each TU from the network timing source, the link separation indicating a number of network links between the respective TU and the network timing source.

5. The method of claim 1, wherein the maximum allowable separation is one less than a total number of TUs allowed in the network.

6. A method for communication in a network having a plurality of transceiver units, the method comprising:
   transmitting by a first transceiver unit (TU) of the plurality of TUs, a first broadcast message, including a first unique identifier of a first timing source of the first TU;
   receiving, from a second TU of the plurality of TUs, a second broadcast message including a second unique identifier of a second timing source of the second TU, wherein the second timing source comprises a third TU of the plurality of TUs, the third TU transmitting a third broadcast message received by the second TU but not received by the first TU;
   selecting a network timing source from the first timing source and second timing source based on a numerical value among the first unique identifier and the second unique identifier, the network timing source serving as a timing reference for communications within the network;
   transmitting by the first TU, a fourth broadcast message having an indication of the first link separation between the first TU and the network timing source;
   receiving at the first TU, additional broadcast messages from other TUs of the plurality of TUs indicating a respective link separation between the other TUs and the network timing source; and
   resetting the first link separation to one more than a lowest link separation received in the additional broadcast messages.

7. The method of claim 6, further comprising determining a first link separation of the first TU from the network timing source indicating a number of network links between the first TU and the network timing source.

8. The method of claim 6, further comprising determining that the network timing source is no longer available when the lowest separation received exceeds a maximum allowable separation.

9. The method of claim 8, wherein the maximum allowable separation is one less than a total number of TUs allowed in the network.

10. A non-transitory computer-readable medium comprising instructions for communication in a network having a plurality of transceiver units, that when executed by one or more processors of a computer, cause the computer to:
    transmit by a first transceiver unit (TU) of the plurality of TUs, a first broadcast message, including a first unique identifier of a first timing source of the first TU;
    receive, from a second TU of the plurality of TUs, a second broadcast message including a second unique identifier of a second timing source of the second TU, wherein the second timing source comprises a third TU of the plurality of TUs, the third TU transmitting a third broadcast message received by the second TU but not received by the first TU;
    select a network timing source from the first timing source and second timing source based on a numerical value among the first unique identifier and the second unique identifier, the network timing source serving as a timing reference for communications within the network;
    transmit by the first TU, a fourth broadcast message having an indication of the first link separation between the first TU and the network timing source;
    receive at the first TU, additional broadcast messages from other TUs of the plurality of TUs indicating a respective link separation between the other TUs and the network timing source; and
    reset the first link separation to one more than a lowest link separation received in the additional broadcast messages.

11. The non-transitory computer-readable medium of claim 10, further comprising instructions that cause the computer to determine a first link separation of the first TU from the network timing source indicating a number of network links between the first TU and the network timing source.

12. The non-transitory computer-readable medium of claim 10, further comprising instructions that cause the computer to determine that the network timing source is no longer available when the lowest separation received exceeds a maximum allowable separation.

* * * * *